(12) United States Patent
Gulledge et al.

(10) Patent No.: US 11,034,273 B2
(45) Date of Patent: Jun. 15, 2021

(54) TRACK-BASED ACCESSORY SYSTEM FOR USE WITH A GOLF CART

(71) Applicant: Nivel Parts & Manufacturing Co., LLC, Jacksonville, FL (US)

(72) Inventors: Bryan Gulledge, Kannapolis, NC (US); Eric R. Schneider, Tampa, FL (US); Cody Baggett, Tallahassee, FL (US)

(73) Assignee: Nivel Parts & Manufacturing Co., LLC, Jacksonville, FL (US)

( * ) Notice: Subject to any disclaimer, the term of this patent is extended or adjusted under 35 U.S.C. 154(b) by 232 days.

(21) Appl. No.: 15/368,839

(22) Filed: Dec. 5, 2016

(65) Prior Publication Data
US 2018/0156381 A1     Jun. 7, 2018

(51) Int. Cl.
| *B60N 3/02* | (2006.01) |
| *B60J 7/10* | (2006.01) |
| *B60J 5/04* | (2006.01) |
| *B60Q 1/32* | (2006.01) |
| *B60Q 3/74* | (2017.01) |
| *B60Q 3/267* | (2017.01) |

(52) U.S. Cl.
CPC ............. *B60N 3/026* (2013.01); *B60J 5/04* (2013.01); *B60J 7/10* (2013.01); *B60J 7/104* (2013.01); *B60Q 1/323* (2013.01); *B60Q 3/267* (2017.02); *B60Q 3/74* (2017.02); *B60J 5/0487* (2013.01)

(58) Field of Classification Search
CPC ... B60J 1/007; B60J 1/085; B60J 1/025; B60J 5/0487; B60J 5/062; B60J 5/065; B60J 5/068; B60J 3/002; B60J 7/0007; B60J 7/104; B60J 7/10; B60J 9/00; B60J 9/02; B60J 9/04; B60J 11/04; B60R 9/042; B60R 9/08; B60Y 2200/23; B62D 33/0621; B60Q 1/323; B60Q 3/267; B60Q 3/74
USPC ................. 296/77.1, 135, 102; 280/DIG. 5
See application file for complete search history.

(56) References Cited

U.S. PATENT DOCUMENTS

| 4,033,397 A | 7/1977 | McKee |
| 4,258,778 A | 3/1981 | Upton et al. |
| 5,732,755 A | 3/1998 | Cross |
| 5,788,317 A | 8/1998 | Nation |
| 5,913,564 A | 6/1999 | Stewart et al. |

(Continued)

FOREIGN PATENT DOCUMENTS

WO    WO2011/119715    9/2011

OTHER PUBLICATIONS

United States Patent and Trademark Office Action in U.S. Appl. No. 13/204,692, dated Jul. 3, 2013.

(Continued)

*Primary Examiner* — Gregory A Blankenship
(74) *Attorney, Agent, or Firm* — Barnes & Thornburg LLP

(57) ABSTRACT

Aspects of the invention relate to a track-based accessory system. The track-based accessory system may be for use with a golf cart. The track-based accessory system may include two elongated members. Each elongated member may be configured to be attached to a golf cart. Each elongated member may include an enclosure track. Each elongated member may also include an accessory track. Each enclosure track may include an enclosure slot. Each enclosure slot may be configured to engage a golf cart enclosure. Each accessory track may include a keyway. Each keyway may be configured to engage at least one accessory.

22 Claims, 13 Drawing Sheets

(56) References Cited

U.S. PATENT DOCUMENTS

| | | | |
|---|---|---|---|
| 6,007,134 A | 12/1999 | Weston | |
| 6,158,801 A | 12/2000 | Tucker | |
| 6,293,616 B1* | 9/2001 | Williams | B60K 37/00 280/DIG. 5 |
| 6,979,044 B2 | 12/2005 | Tyrer | |
| 7,354,092 B2 | 4/2008 | Showalter et al. | |
| 7,448,666 B2 | 11/2008 | Tyrer | |
| 7,980,614 B2* | 7/2011 | Denton | B60R 7/04 296/24.3 |
| 8,087,711 B1* | 1/2012 | Mauro | B60J 1/06 280/DIG. 5 |
| 8,668,242 B2 | 3/2014 | Sobik | |
| 9,248,724 B1* | 2/2016 | Judisch | B60J 5/0487 |
| 9,561,707 B1* | 2/2017 | Walicki, Sr. | B60J 5/0487 |
| 2001/0054830 A1* | 12/2001 | Essig | B60J 7/104 296/102 |
| 2006/0290163 A1* | 12/2006 | Showalter | B62D 33/0621 296/102 |
| 2008/0128671 A1 | 6/2008 | Lyons | |
| 2011/0168340 A1 | 7/2011 | Squillante | |
| 2014/0035313 A1* | 2/2014 | Sobik | B60J 7/0007 296/135 |
| 2014/0152048 A1 | 6/2014 | Sobik | |
| 2016/0193958 A1* | 7/2016 | Smith | B60Q 1/28 362/473 |
| 2017/0368919 A1* | 12/2017 | Guempel | B60J 5/0469 |
| 2018/0156381 A1* | 6/2018 | Gulledge | F16M 13/02 |
| 2018/0257467 A1* | 9/2018 | Rodriguez | B60J 7/106 |

OTHER PUBLICATIONS

United States Patent and Trademark Office Action in the U.S. Appl. No. 13/204,692, dated Dec. 5, 2012.

United States Patent and Trademark Office Action in the U.S. Appl. No. 14/174,976, dated Mar. 12, 2015.

Canadian Patent and Trademark Office Action in Canadian Patent Application No. 2,784,161, dated Nov. 29, 2013.

Canadian Patent and Trademark Office Action in Canadian Patent Application No. 2,784,161, dated Jan. 29, 2015.

Canadian Patent and Trademark Office Action in Canadian Patent Application No. 2,784,161, dated Aug. 5, 2016.

http://www.custom-inc.com/golf-car-tops/, Retrieved on Mar. 30, 2015.

"Custom Golf Car Supply 2010 Dealer Price List," Custom Golf Car Supply, Inc., Spring and Summer 2010.

"Double Take Classic Enclosures-2 Passenger for Use With 60" Short Track Tops," Custom Golf Car Supply, Inc., Retrieved on Mar. 30, 2015.

"Double Take Classic Enclosures-4 Passenger for Use With 80" Long Track Tops," Custom Golf Car Supply, Inc., Retrieved on Mar. 30, 2015.

"2-Pass Premium Track Enclosure," Double Take, Dec. 20, 2012.

"2-Pass Premium Enclosure (E2P)," Elite 2-Passenger Enclosure System, Sep. 20, 2010.

"2, 4 and 6 Passenger Enclosures," Custom Golf Car Supply, Inc., Feb. 23, 2015.

"Golf Car Advisor," Jan./Feb. 2008.

"Golf Car Advisor: Ruff & Tuff: New, Street & Green in 2007!," Inc., Mar./Apr. 2007.

"Golf Car Advisor: D&D Motor Systems enhances its technology leader role with NEW Regen Motor & Controller Combos!," Sep./Oct. 2007.

"Long Track Top 4-Passenger Top Kits," Custom Golf Car Supply, Inc., Dec. 18, 2014.

"Short Track Top 2-Passenger Top Kits," Custom Golf Car Supply, Inc., Dec. 18, 2014.

* cited by examiner

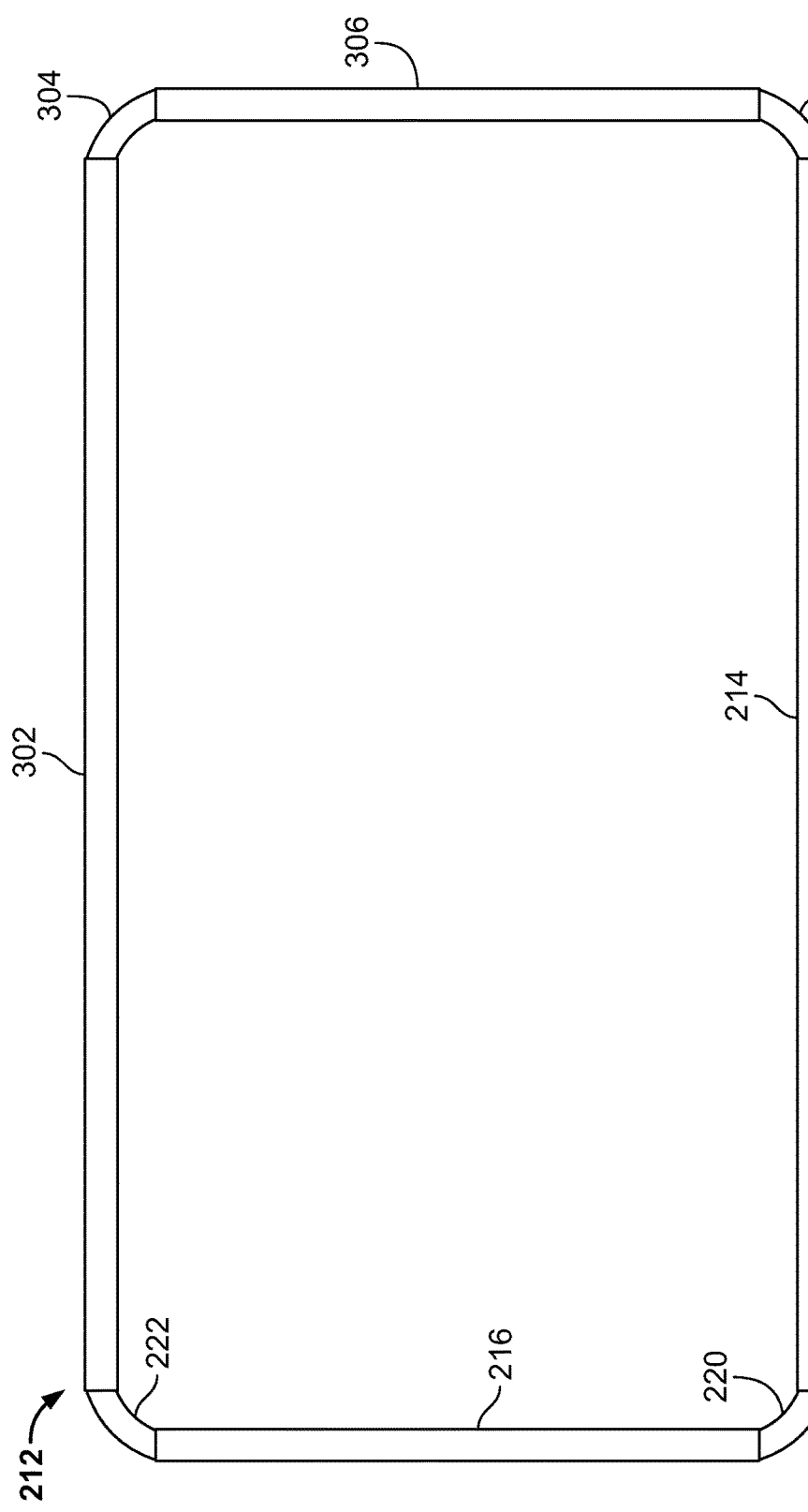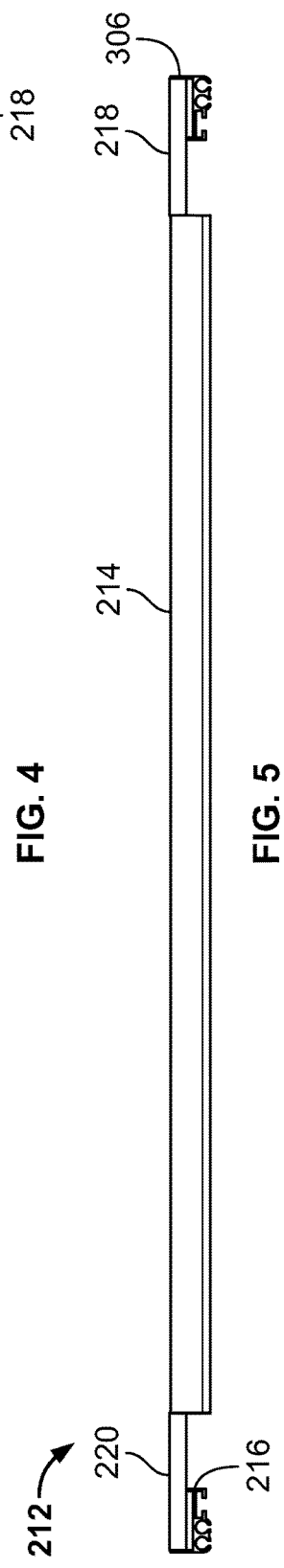

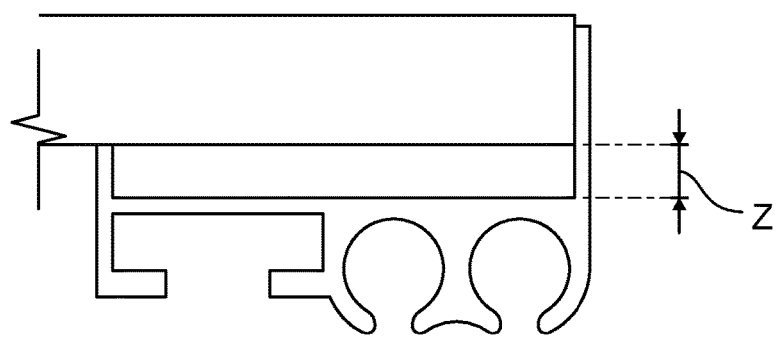
FIG. 25
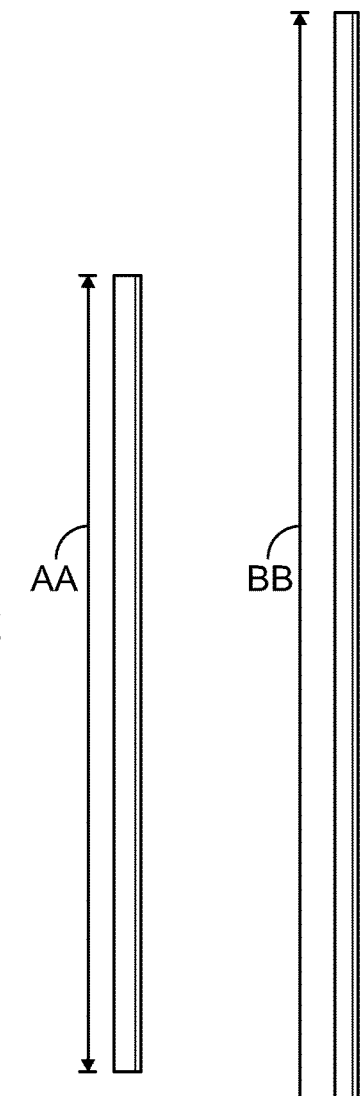
FIG. 26
FIG. 27

TRACK-BASED ACCESSORY SYSTEM FOR USE WITH A GOLF CART

FIELD OF TECHNOLOGY

This invention relates to golf carts. More specifically, this invention relates to accessory systems for golf carts.

BACKGROUND OF THE DISCLOSURE

Conventionally, golf cart enclosures and golf cart valances were hung from mounting devices on top of golf carts. In certain legacy systems, one or two tracks were included in the mounting devices. In certain instances, a first track was designed to hold a golf cart enclosure. A second track was designed to hold a golf cart valance. Typically, the golf cart valance hung on top of the golf cart enclosure so the golf cart valance, which was primarily for decorative purposes, was viewable from the outside of the cart.

A golf cart user may also desire to hang accessories in the golf cart. It would therefore be desirable to incorporate an accessory track into the mounting devices.

SUMMARY OF THE DISCLOSURE

A track-based accessory system for use with a golf cart is provided. The track-based accessory system may support a valance. The track-based accessory system may also support a golf cart enclosure. The track-based accessory system may also support one or more accessories.

The track-based accessory system may include a metal fixture or other suitable material such as plastic. The metal fixture may be, preferably, an extruded metal fixture. The metal fixture may extend from the golf cart. The metal fixture may be configured to be attached to a golf cart. The metal fixture may include one or more elongated members. The metal fixture may also include corner members. In certain embodiments, the corner members may join two elongated members together. The metal fixture may include any other suitable mounting hardware. Each elongated member may include a first track, a second track and a third track. Each elongated member may include any other suitable number of tracks.

The first track may include a first slot. The first slot may be configured to maintain the valance in a first position. The second track may include a second slot. The second slot may be configured to maintain the golf cart enclosure in a second position. The third track may include a keyway. The keyway may be configured to maintain one or more accessories in a third position.

In certain embodiments, the housing associated with the first slot may be rounded. The housing may be configured to mate with a bead attached to a valance or golf cart enclosure. The bead may be a rounded bead. The housing may open, along its length, at one or more openings. The opening(s) may enable a bead to be inserted into the housing. The opening may also enable the beaded valance or golf cart enclosure to continue through the opening. In certain embodiments, the opening may be large enough to enable a bead to snap into the housing. The opening may be small enough to ensure that a bead inserted into the housing is maintained within the housing and does not disengage from the housing without a pre-determined quantum of effort or range of effort.

In certain embodiments, the housing associated with the second slot may also be rounded. The housing may be configured to mate with a bead included on a valance or golf cart enclosure. The bead may be a rounded bead. The housing may open, along its length, at one or more openings. The opening(s) may enable a bead to be inserted into the housing. The opening may also enable the attached valance or golf cart enclosure to continue through the opening. In certain embodiments, the opening may be large enough to enable a bead to snap into the housing. The opening may be small enough to ensure that a bead inserted into the housing is maintained within the housing and does not disengage from the housing without effort.

In certain embodiments, the keyway may be rectangular or other suitable shape. The keyway may be configured to mate with a key included on an accessory. The key may be rectangular shaped. The keyway may open at an opening. The opening may enable the key of the accessory to be connected to the remainder of the accessory.

In some embodiments, the keyway may be triangular, circular, hexagonal or any other suitable geometric shape. In these embodiments, a key, included on an accessory, may preferably match the shape of the keyway.

In certain embodiments, the accessory may include a handle. The handle may be connected to a key. The key may be rectangular. The key may mate with a rectangular keyway. The handle may enable a driver or passenger of the golf cart to grasp onto the handle, thereby stabilizing the user, upon entry, exit or transport therein, with respect to the roof on the golf cart. Grasping onto the handle of the golf cart may also stabilize the passenger and/or driver of the golf cart while getting on or off of the golf cart.

In some embodiments, the accessory may include a light. The light may be attached to a key. The key may be rectangular. The key may mate with a rectangular keyway. The light may enable a golf cart user to better view the interior and/or exterior of the golf cart. The light may also be used as decorative lights. The light may be an LED light bank. The light may be an OLED light bank. The light may be a conventional light bulb. The light may include a switch. The switch may enable a user to power on and power off the light. The light may be electronically coupled, either by wired or wireless coupling to an electrical system of the vehicle. Accordingly, the light may be turned on or off from a power switch located alongside controls of the vehicle.

In certain embodiments, the first slot, the second slot and the keyway may open in the same direction. In other embodiments, the first slot, the second slot and the keyway may open in one or more directions.

In certain embodiments, the valance may be removably engaged to the first track. The valance may be engaged in the first track. In certain embodiments, the valance may not be permanently engaged in the first track. Rather, the valance may be maintained in the first track until a user desires to remove the valance or change the position of the valance.

In certain embodiments, the golf cart enclosure may be removably engaged to the second track. In certain embodiments, the golf cart enclosure may not be permanently engaged in the second track. Rather, the golf cart enclosure may be maintained in the second track until a user desires to remove the golf cart enclosure or change the position of the golf cart enclosure.

In certain embodiments, an accessory may be removably engaged to the third track. In some embodiments, the accessory may not be permanently engaged in the third track. Rather, the accessory may be maintained in the third track until a user desires to remove the accessory or change the position of the third accessory.

In certain embodiments, the first track is configured to mate with an elongated plastic bead affixed to the valance.

In certain embodiments the second track is configured to mate with an elongated plastic bead affixed to the golf cart enclosure.

In certain embodiments, the accessory and/or the valance may be attached to the golf cart enclosure using Velcro™ or any other suitable attachment device. This may enable the accessory and/or the valance to be removably engaged with the golf cart enclosure without requiring the additional tracks of the metal fixture.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows a top view of a metal fixture according to certain embodiments;

FIG. 5 shows a side view of a metal fixture according to certain embodiments;

FIG. 25 shows a side view of a corner member inserted into an elongated member according to certain embodiments;

FIG. 26 shows a side view of an elongated member according to certain embodiments;

FIG. 27 shows a side view of another elongated member according to certain embodiments.

DETAILED DESCRIPTION OF THE DISCLOSURE

Figure 1:
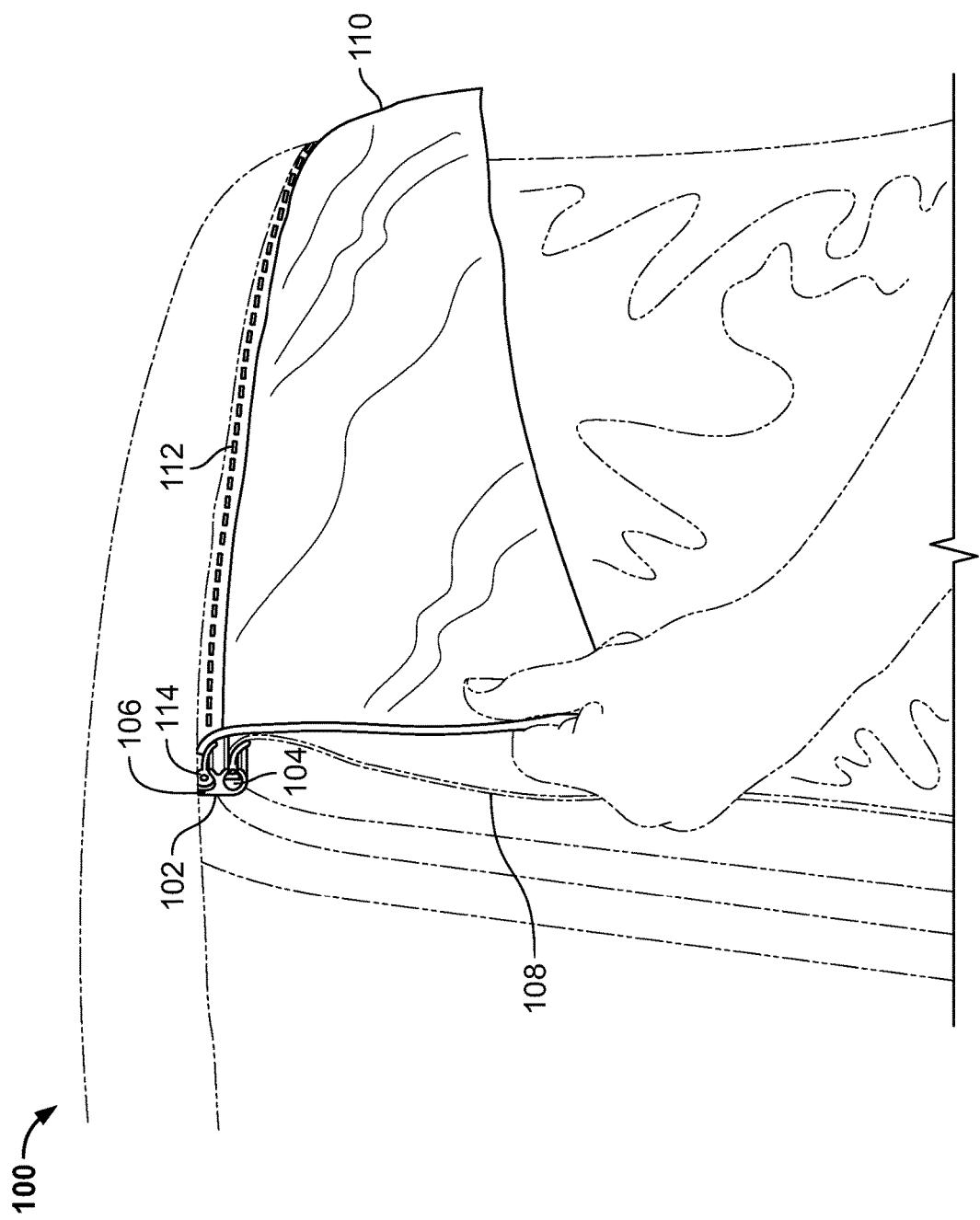
FIG. 1 shows a prior art portion of a golf cart.

A track-based accessory system may be provided. The system may be for use with a golf cart. The track-based system may include a metal fixture. The metal fixture may extrude from the golf cart. The metal fixture may be constructed of aluminum or any other suitable metal material or combination of elements or materials.

The metal fixture may be configured to be attached to a golf cart. The metal fixture may be attached to a golf cart, and/or fixed in place on a golf cart, with screws, hex-bolts, adhesive or any other suitable attachment means. The metal fixture, which may include multiple elongated members, may include two short elongated members. The metal fixture may also include two long elongated members.

In certain embodiments, the metal fixture may be configured to support, in whole or in part, a golf cart roof.

The two short elongated members may be for use in the front and back of the golf cart. Each short elongated member may include an enclosure track. Each short elongated member may also include an accessory track. Each short elongated member may also include two ends.

The metal fixture may also include two long elongated members. The two long elongated members may be for use on the two sides of the golf cart. Each long elongated member may include an enclosure track. Each long elongated member may also include an accessory track. Each long elongated member may also include a cavity.

The metal fixture may also include one or more corner members. Each corner member may be configured to extend into the cavity on one of the long elongated members. Each corner member may also be configured to extend into the cavity on one of the short elongated members. Each corner member may be shaped in a rounded manner. Each corner member may also be shaped in an "L-shaped" manner. In some embodiments, there may be four corner members included in the metal fixture.

It should be appreciated that, in some embodiments, one of two of the elongated members may include an accessory track. In these embodiments, other elongated members may include a valance and an enclosure track but not an accessory track. It should also be appreciated that, in some embodiments, only one or two elongated members may be used.

Each enclosure track may include an enclosure slot. The enclosure slot may be configured to engage the golf cart enclosure. Each accessory track may also include a keyway. The keyway may be configured to engage a key included on the at least one accessory. In certain embodiments, the accessory may hang from the slots.

Each elongated member may also include a valance track. The valance track may include a valance slot. The valance slot may be configured to engage the valance.

In certain embodiments, the accessory may include a handle. The handle may enable a driver or passenger of the golf cart to grasp onto the handle, thereby stabilizing the user with respect to the roof on the golf cart. Grasping onto the handle of the golf cart may stabilize the passenger and/or driver of the golf cart while getting on or off of the golf cart. Grasping onto the handle may also stabilize the passenger during transport.

In some embodiments, the accessory may include one or more lights. The lights may illuminate the golf cart interior. The lights may also illuminate the exterior of the golf cart. In some embodiments, the lights may turn on automatically based on states of outdoor visibility, changes of states of outdoor visibility, time of day or based on any other suitable cause or trigger.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a portion of prior art golf cart 100. Golf cart 100 includes track 102. Track 102 includes housing 104. Track 102 also includes housing 106. Housing 104 is configured to mate with a bead attached to golf cart enclosure 108. Housing 106 is configured to mate with bead 114 which is attached to golf cart valance 110. Golf cart valance 110 may be attached to bead 114 with stitches or bonding 112.

Figure 2:
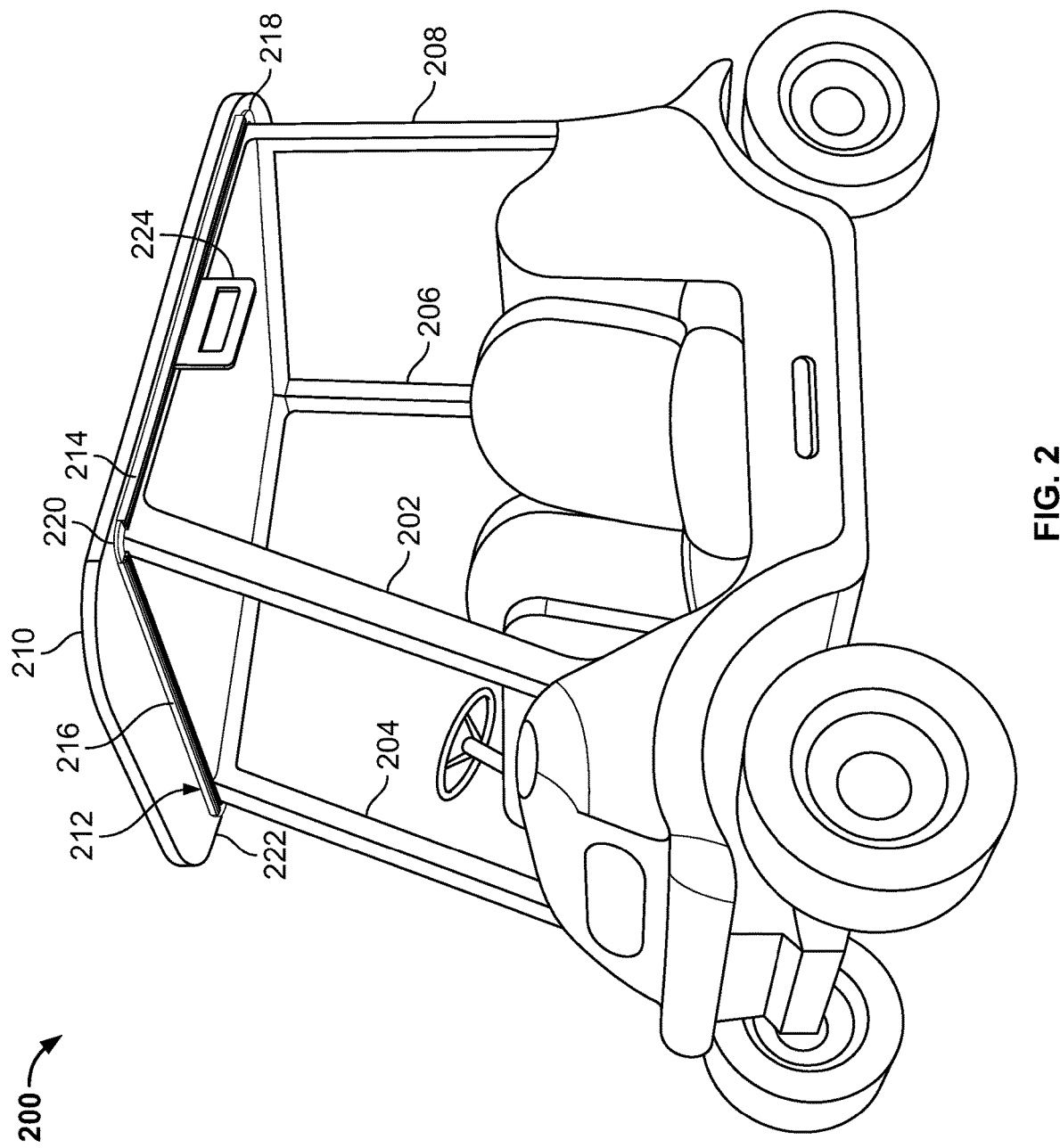
FIG. 2 shows a perspective view of a golf cart according to certain embodiments.

FIG. 2 shows golf cart 200. Golf cart 200 may include poles 202, 204, 206 and 208. Poles 202, 204, 206 and 208 may support roof 210. Golf cart 200 may also include metal fixture 212. Metal fixture 212 may include elongated member 214. Elongated member 214 may be attached to the portion of roof 210 which is distal with respect to the interior of the golf cart from a line in between poles 202 and 208. Metal fixture 212 may include elongated member 216. Elongated member 212 may be attached to the portion of roof 210 which is distal with respect to the interior of the golf cart from a line in between poles 202 and 204. It should be appreciated that elongated member 212 may be shorter than elongated member 214. This may be because the distance between poles 202 and 204 may be shorter than the distance between 202 and 208. An additional elongated member (not shown) may be attached to the portion of roof 210 which is distal with respect to the interior of the golf cart from a line in between poles 204 and 206. Another additional elongated member (not shown) may be attached to the portion of roof 210 which is distal with respect to the interior of the golf cart from a line in between poles 206 and 208.

Metal fixture 212 may also include corner members 218, 220 and 222. Corner members 218, 220 and 222 may be rounded. Corner member 220 may join elongated member 216 to elongated member 214. Corner member 218 may join elongated member 214 to another elongated member (not shown). Corner member 222 may join elongated member 216 to another elongated member (no shown).

Golf cart 200 may also include accessory 224. Accessory 224 may be engaged in elongated member 214.

In some embodiments, elongated members and corner members could be mounted on the roof. In some embodiments, elongated members and corner members could serve as a roof support—i.e., the only points of attachment between the roof and the golf cart may be located on the metal fixture. Such points of attachment may include tracks for mounting the roof on the top side of the metal fixture.

Figure 3:
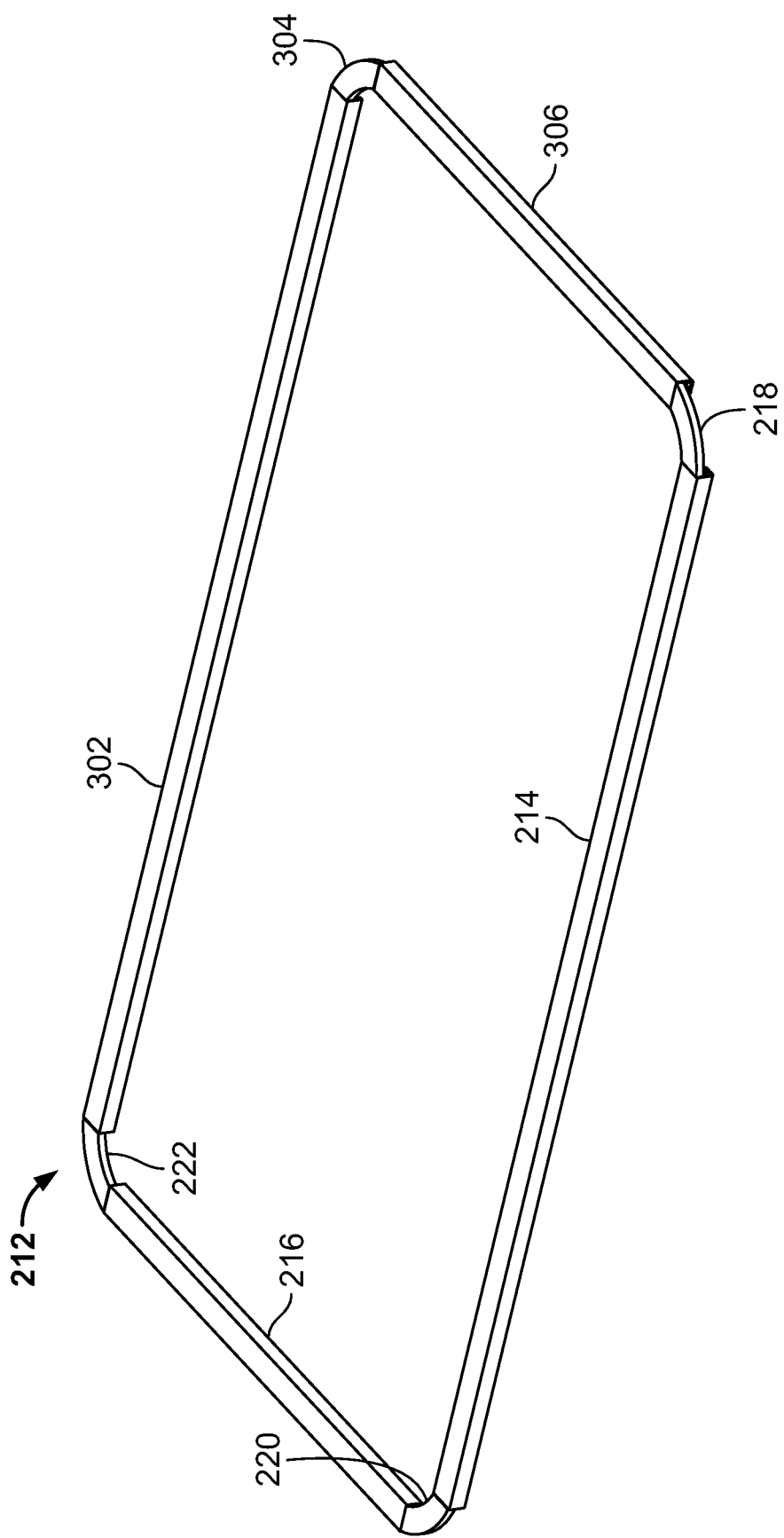
FIG. 3 shows a perspective view of a metal fixture according to certain embodiments.

FIG. 3 shows a perspective view of metal fixture 212. Metal fixture 212 may include elongated members 214 and 216, as shown in FIG. 2. Metal fixture 212 may also include elongated members 302 and 306, as discussed in FIG. 2 but not shown. Elongated member 214 may be joined to elongated member 216 with corner member 220, as shown in FIG. 2. Elongated member 214 may be joined to elongated member 306 with corner member 218. Elongated member 306 may be joined to elongated member 302 with corner member 304. Elongated member 302 may be joined to elongated member 216 with corner member 222. It should be appreciated that elongated members 302 and 214 may be longer than elongated members 306 and 216. The length of elongated members 214 and 302 may correspond to the length of golf cart 200 while the length of elongated members 216 and 306 may correspond to the width of golf cart 200. The length of golf cart 200 may be longer than the width of golf cart 200.

FIG. 4 shows a top view of metal fixture 212. Metal fixture 212 may include elongated members 214, 216, 302 and 306, as shown and described in connection with FIG. 3. Metal fixture 212 may also include corner members 218, 220, 222 and 304. It should be noted that the width of elongated members 214, 216, 302 and 306 may be marginally wider than corner members 218, 220, 222 and 304.

FIG. 5 shows a side view of metal fixture 212. Metal fixture 212 may include elongated members 214, 216 and 306. Corner member 220 may join elongated member 214 to elongated member 216. Corner member 218 may join elongated member 214 to elongated member 306. It should be appreciated that corner members 218 and 220 may be smaller in height than elongated members 214, 216 and 306.

Figure 6:
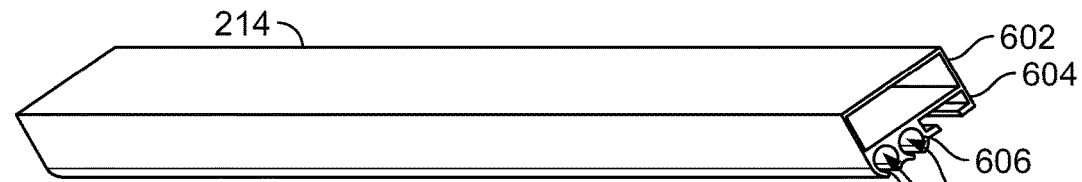
FIG. 6 shows a perspective view of an elongated member according to certain embodiments.

FIG. 6 shows a perspective view of elongated member 214. Elongated member 214 may include cavity 602. Cavity 602 may be configured to hold a portion of a corner member, such as corner member 218, as shown in FIG. 5.

Elongated member 214 may also include keyway 604. Keyway 604 may be configured to mate with a key. The key may be appended to an accessory, such as accessory 224, shown in FIG. 2.

Elongated member 214 may also include housing 606. Housing 606 may surround slot 610. Housing 606 may be rounded. The rounded housing may enable a rounded bead to mate with slot 610.

Elongated member 214 may also include housing 608. Housing 608 may surround slot 612. Housing 608 may be rounded. The rounded housing may enable a rounded bead to mate with slot 612.

Figure 7:
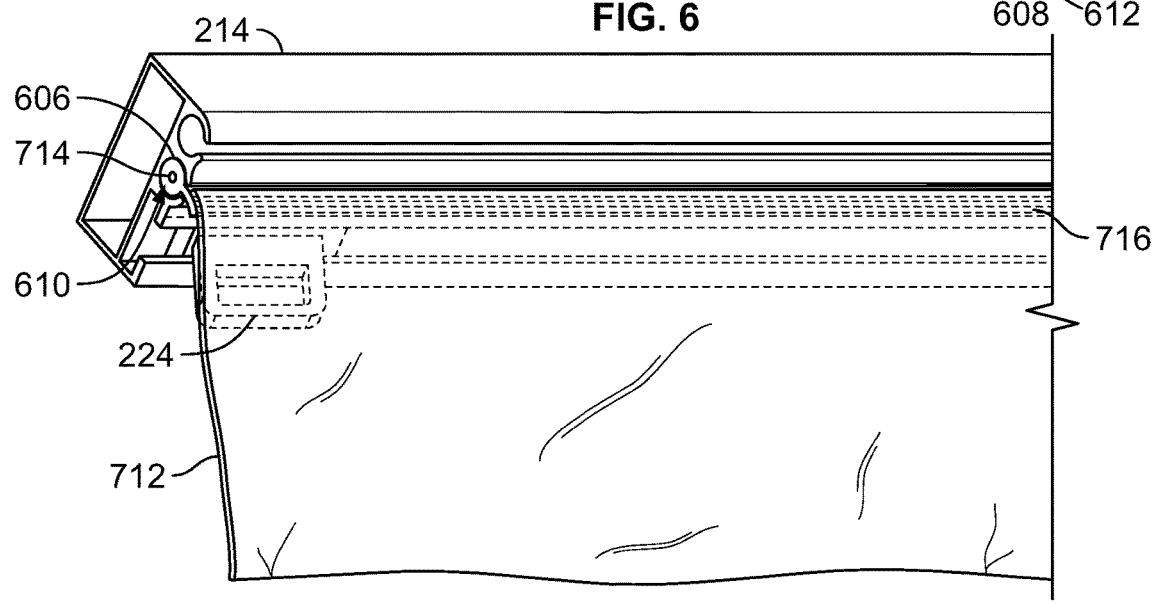
FIG. 7 shows another perspective view of an elongated member according to certain embodiments.

FIG. 7 shows elongated member 214. Accessory 224 may be engaged in keyway 604 of elongated member 214. Elongated member 214 may include housing 606. Housing 606 may surround slot 610. Bead 714 may be rounded to mate with slot 610. Bead 714 may be attached to golf cart enclosure 712 utilizing stitches 716, bonding (not shown) or any other suitable adhesive material. Accessory 224 may be positioned inside of golf cart enclosure 712. Positioning accessory 224 inside golf cart enclosure 712 may enable a user to utilize accessory 224 while the golf cart enclosure is in use. Positioning accessory 224 inside golf cart enclosure 712 may also provide a protection to accessory 224 in the event of rain or other inclement weather.

Figure 8:
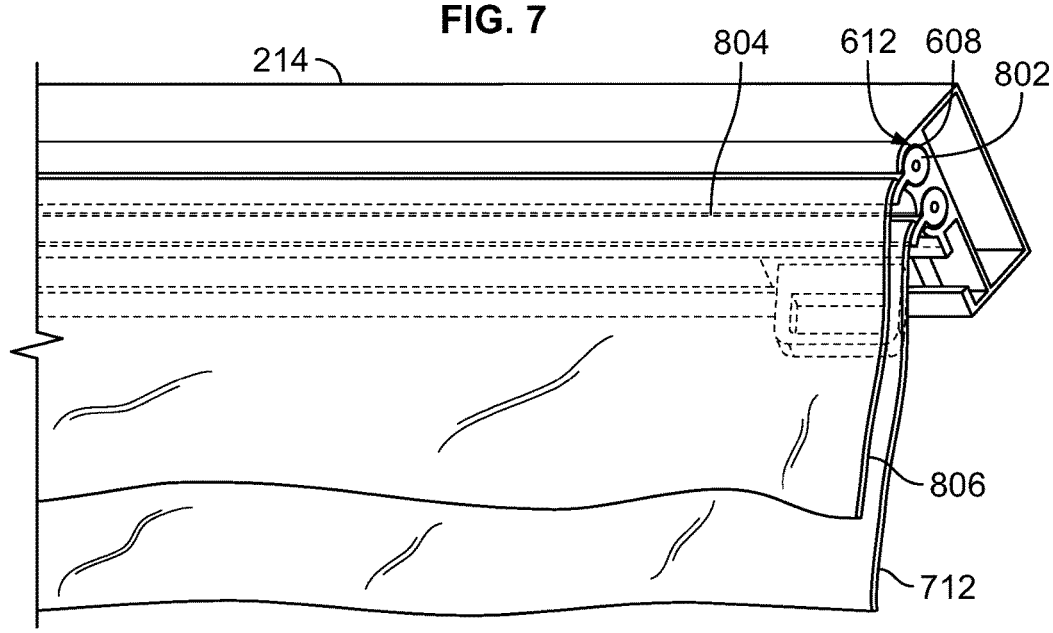
FIG. 8 shows yet another perspective view of an elongated member according to certain embodiments.

FIG. 8 shows elongated member 214. Elongated member 214 may include housing 608. Housing 608 may surround slot 612. Bead 802 may be rounded to mate with slot 612. Bead 802 may be attached to golf cart valance 806 utilizing stitches 804, bonding (not shown) or any other suitable adhesive material. Golf cart valance 806 may lay on top of golf cart enclosure 712. Therefore, golf cart valance 806 may be viewable from outside golf cart 200.

Figure 9:
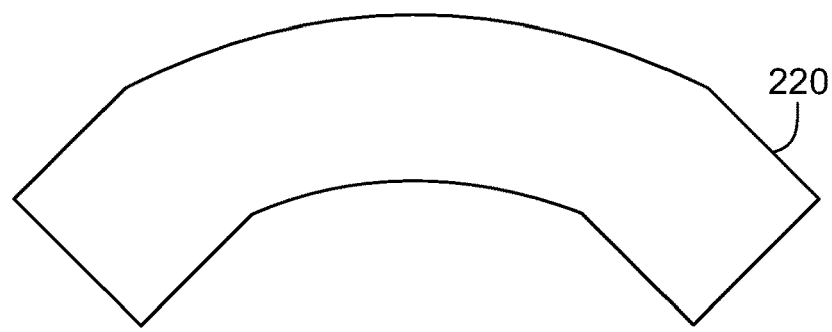
FIG. 9 shows a top view of a corner member according to certain embodiments.

FIG. 9 shows a top view of corner member 220.

Figure 10:
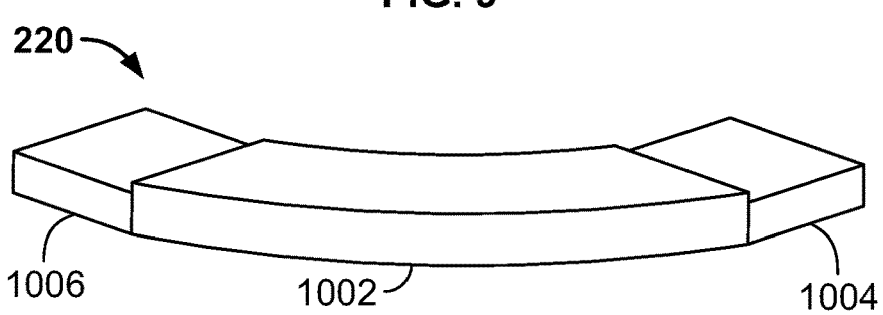
FIG. 10 shows a top perspective view of a corner member according to certain embodiments.

FIG. 10 shows a top perspective view of corner member 220. Corner member 220 may include sections 1002, 1004 and 1006. It should be appreciated that section 1002 may be taller than sections 1004 and 1006.

Figure 11:
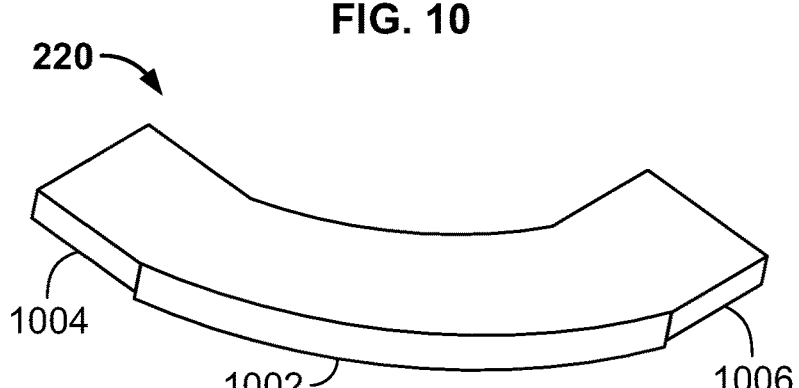
FIG. 11 shows a bottom perspective view of a corner member according to certain embodiments.

FIG. 11 shows a bottom perspective view of corner member 220. It should be appreciated that section 1002 is wider than sections 1004 and 1006.

Figure 12:
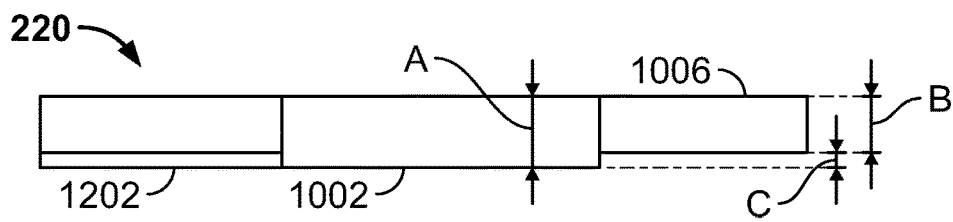
FIG. 12 shows a side view of a corner member according to certain embodiments.

FIG. 12 shows a side view of a right bottom view of corner member 220. Section 1002 may have a width of A. Section 1006 may have a width of B. The difference between the width of A and B may be C. Section 1202 may be a portion of 1002 that continues into section 1004 (shown in FIG. 11).

Figure 13:
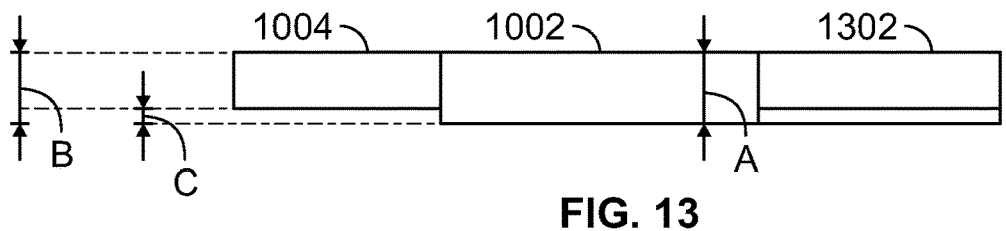
FIG. 13 shows another side view of a corner member according to certain embodiments.

FIG. 13 shows a side view of a left bottom view of corner member 220. Section 1002 may have a width of A. Section 1004 may have a width of B. The difference between the width of A and B may be C. Section 1302 may be a portion of 1002 that continues into section 1006 (shown in FIG. 12).

Figure 14:
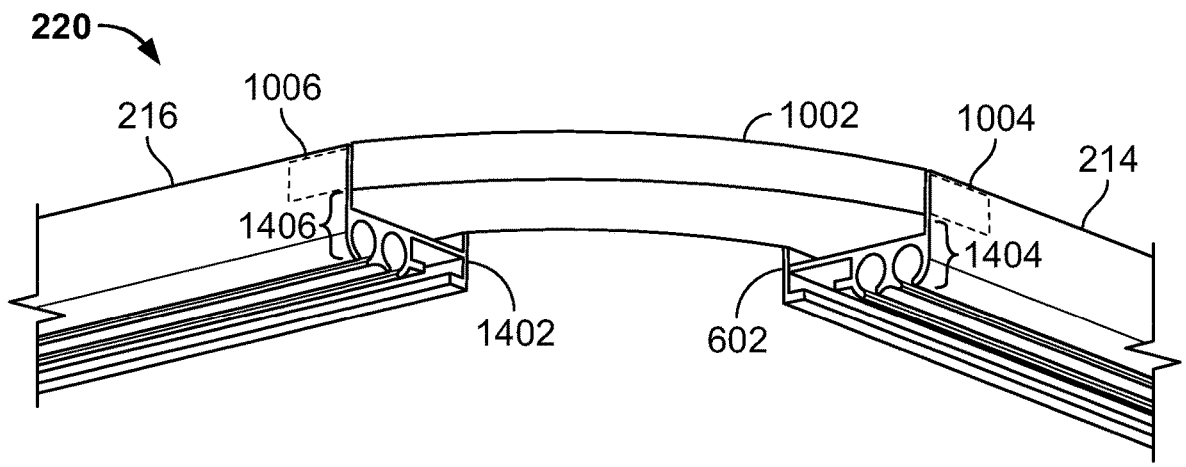
FIG. 14 shows a bottom perspective view of a corner member inserted into two elongated members according to certain embodiments.

FIG. 14 shows bottom view of corner member 220 inserted into elongated members 216 and 214. Section 1004 may be smaller in height than section 1002, as discussed in connection with FIGS. 9-13. Section 1004 may be inserted into cavity 602. Section 1002 may not be inserted into cavity 602. The height of section 1002 may block section 1002 from entering cavity 602. Elongated member 216 may include cavity 1402. Section 1006 may be inserted into cavity 1402. Section 1002 may not be inserted into cavity 602. The height of section 1002 may block section 1002 from entering cavity 1402. The height of corner member 220 may be smaller than the height of elongated members 214 and 216, as discussed in connection with FIG. 5. It should be appreciated that bottom portion 1404 and bottom portion 1406 may be open when corner member 220 is engaged in elongated members 214 and 216. Leaving bottom portions 1404 and 1406 open may enable access to bottom portions 1404 and 1406 while corner member 220 is engaged in elongated members 214 and 216.

Figure 15:
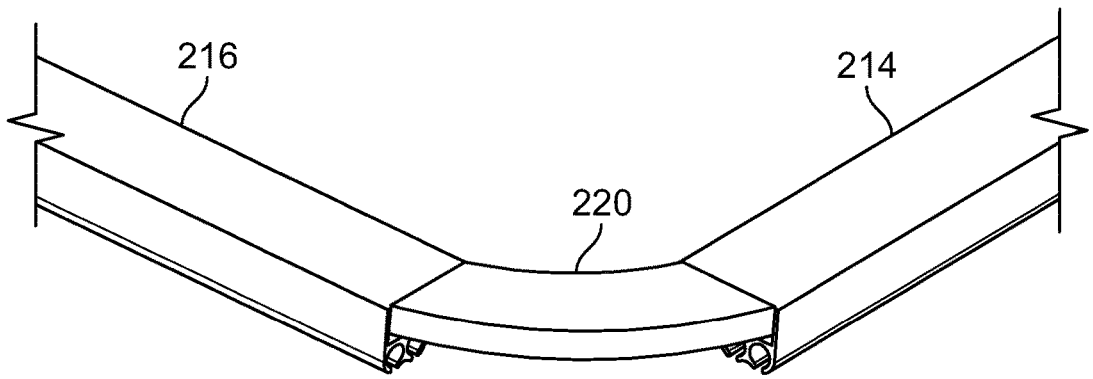
FIG. 15 shows a top perspective view of a corner member inserted into two elongated members according to certain embodiments.

FIG. 15 shows a top view of corner member 220 engaged in elongated members 214 and 216.

Figure 16:
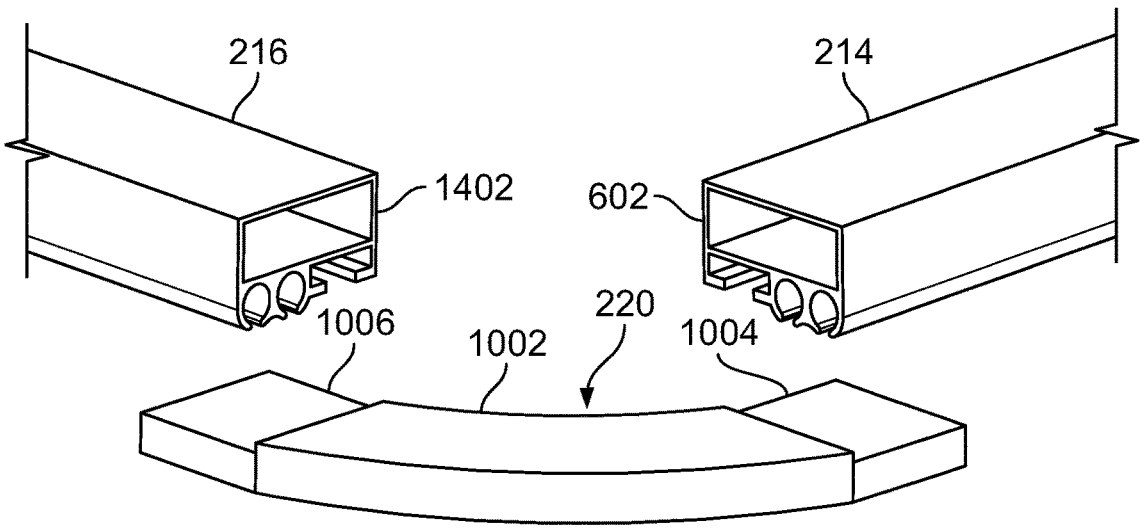
FIG. 16 shows an exploded view of a corner member and two elongated members according to certain embodiments.

FIG. 16 shows an exploded view of corner member 220 and elongated members 214 and 216. Section 1004 may be configured to be inserted into cavity 602 of elongated member 214. Section 1006 may be configured to be inserted into cavity 1402 of elongated member 216. Section 1002 may be blocked from being inserted into cavities 1402 and 602 because of the height discrepancy discussed above in connection with FIG. 14.

Figure 17:
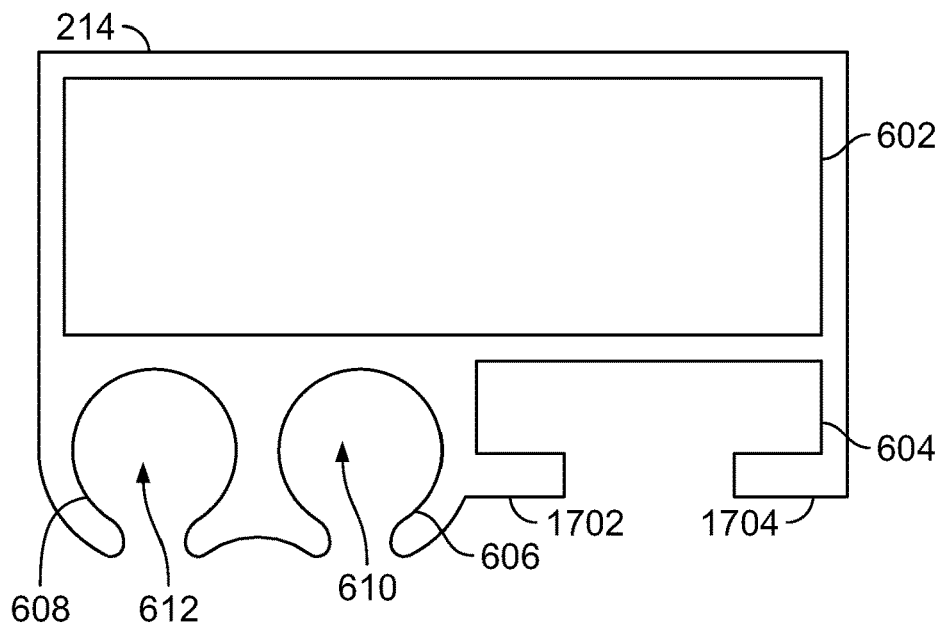
FIG. 17 shows a cutaway view of an elongated member according to certain embodiments.

FIG. 17 shows a cross-sectional view of elongated member 214. Elongated member 214 may include cavity 602, keyway 604, housing 606, slot 610, housing 608 and slot 612, all of which have been described in connection with FIG. 6. Keyway 604 may include protrusions 1704 and 1702. Protrusions 1704 and 1702 may enable an accessory to be secured into keyway 604. Protrusions 1704 and 1702 may also block the accessory from falling out of keyway 604. Protrusions 1704 and 1702 may also enable the accessory to bear weight because even in the event that a user tugs on the accessory, protrusions 1704 and 1702 block the accessory from coming out of keyway 604. Each of housing 606 and 608 may open at an opening. The opening may enable a bead to be inserted into the housing. The opening may also enable the attached valance or golf cart enclosure to continue through the opening. The opening may be large enough to enable a bead to snap into the housing. The opening may be small enough to ensure that a bead inserted into the housing is maintained within the housing and does not disengage from the housing without effort.

Figure 18A:
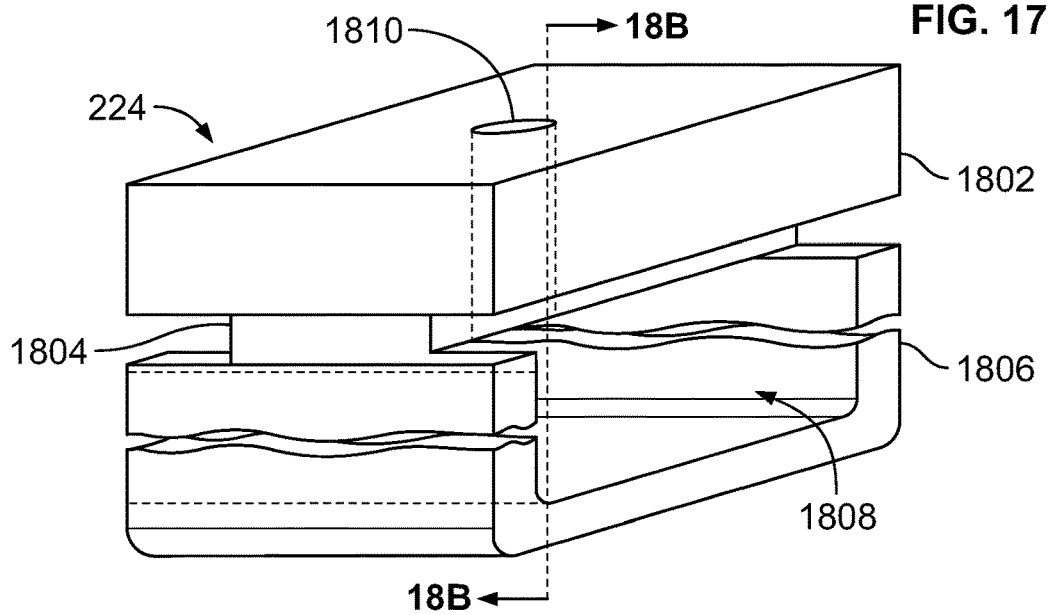
FIG. 18A shows a perspective view of a handle according to certain embodiments.

FIG. 18A shows a perspective view of accessory 224. Accessory 224 may be a handle. Accessory 224 may include key portion 1802. Key portion 1802 may mate with keyway 604, as shown in FIG. 17. Accessory 224 may include neck portion 1804. Neck portion 1804 may enable accessory 224 to contour to protrusions 1702 and 1704, shown in FIG. 17. Accessory 224 may include handle portion 1806. Handle portion 1806 may enable a user to use accessory 224. Accessory 224 may include hole 1808. Hole 1808 may enable a user to place his or her hand through handle portion 1806. Accessory 224 may include screw hole 1810. Screw hole 1810 may accommodate a hex-bolt or any other suitable screw.

It should be appreciated that, in some embodiments, a plurality of screws may be used. Therefore a plurality of screw holes may be used. It should also be appreciated that, in some embodiments, the screw hole(s) may continue through the accessory. This may enable a user to easily screw or unscrew the accessory. In some embodiments, an angled screwdriver or screwdriver attachment may be used to screw in the screws. This may be helpful when the clearance for the screwdriver is limited. It should also be appreciated that, in some embodiments, the screw hole(s) may be positioned on an angle other than ninety degrees to the keyway in order to enable a user to easily access the screw hole.

Figure 18B:
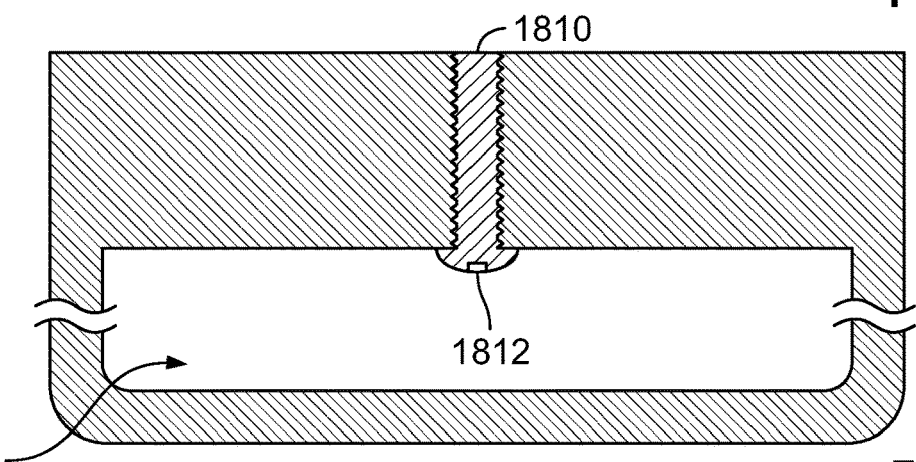
FIG. 18B shows a cutaway view of the handle shown in FIG. 18A according to certain embodiments.

FIG. 18B shows a cutaway view along the line designated in FIG. 18 for FIG. 18B. Screw 1812 may be inserted into screw hole 1810. Screw 1812, when screwed into screw 1810, may secure accessory 224 to the top of keyway 604, as shown in FIG. 17.

Figure 19:
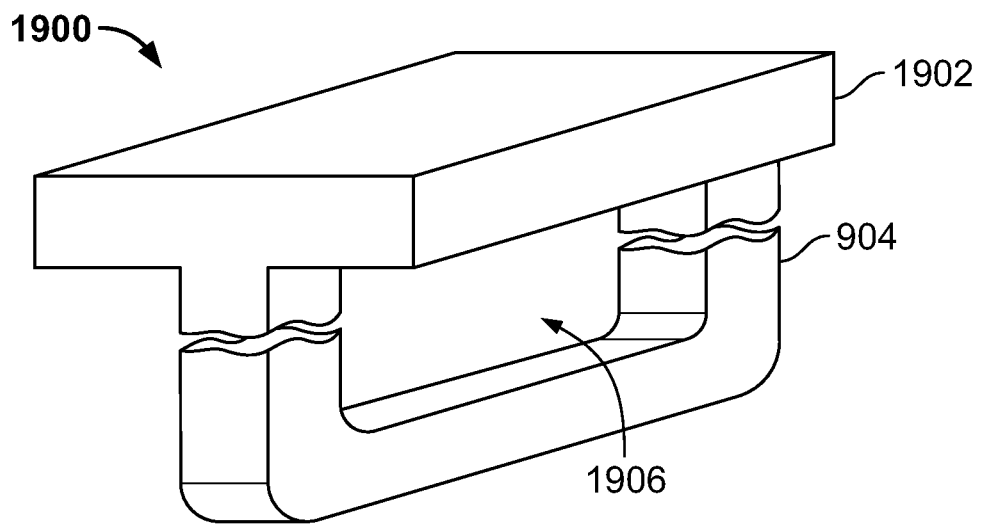
FIG. 19 shows a perspective view of another handle according to certain embodiments.

FIG. 19 shows a perspective view of accessory 1900. Accessory 1900 may be a handle. Accessory 1900 may include key portion 1902. Key portion 1902 may mate with keyway 604, as shown in FIG. 17. Accessory 1900 may include handle portion 1904. Handle portion 1904 may enable a user to use accessory 1904. Accessory 1900 may include hole 1906. Hole 1906 may enable a user to place his or her hand through handle 1906. It should be noted that accessory 1900 does not include a neck portion. This may be because handle portion 1906 is thinner than handle portion 1806, shown in FIG. 18A.

Figure 20A:
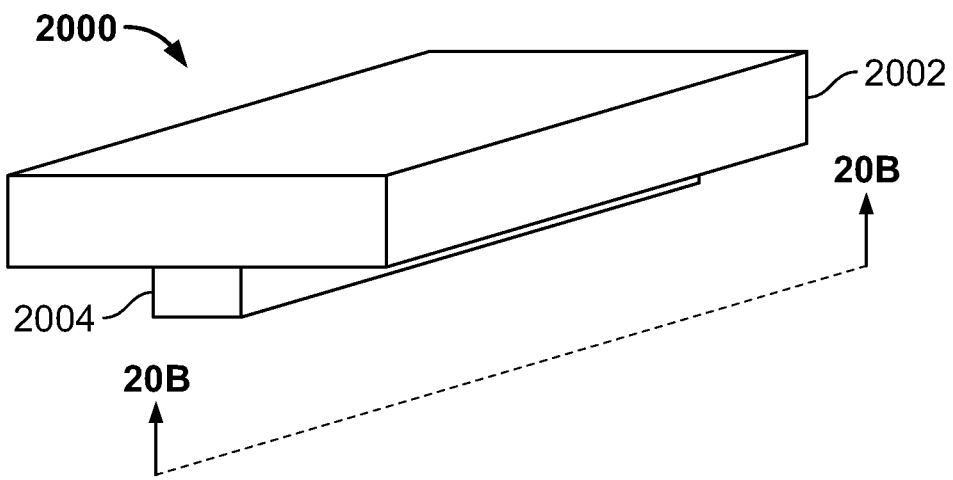
FIG. 20A shows a perspective view of an LED light according to certain embodiments.

FIG. 20A shows accessory 2000. Accessory 2000 may include key portion 2002 and LED light bank 2004. Key portion 2002 may mate with keyway 604, as shown in FIG. 17. LED light bank 2004 may provide light. Accessory 2000 may also include a switch (not shown) to power on and off LED light bank 2004.

Figure 20B:
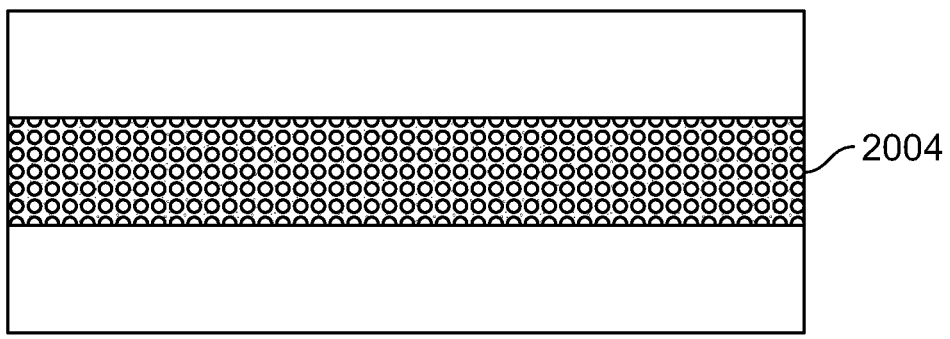
FIG. 20B shows another view of the LED light shown in FIG. 20A according to certain embodiments.

FIG. 20B shows a bottom view along the line designated in FIG. 20 for FIG. 20B. In some embodiments, LED light bank 2004 may protrude from key portion 2002. In some embodiments, an LED light bank may be flush with a key portion of an accessory.

Figure 21:
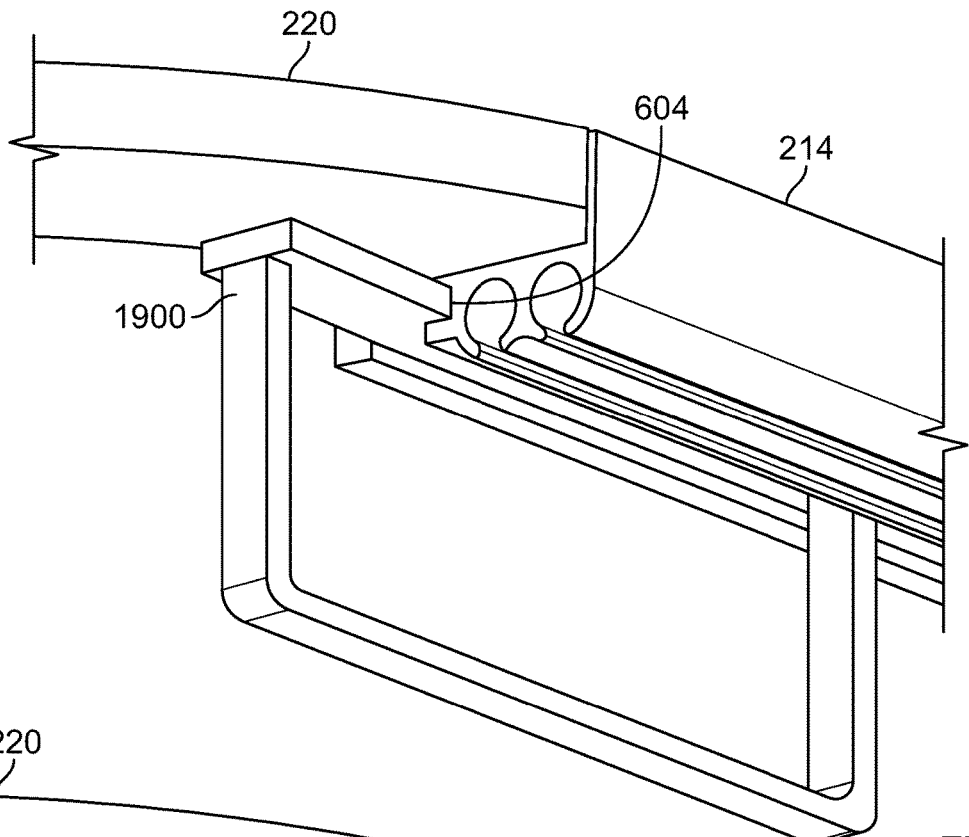
FIG. 21 shows a perspective view of a handle being inserted into an elongated member according to certain embodiments.

FIG. 21 shows accessory 1900 being inserted into keyway 604, which is included in elongated member 214.

Figure 22:
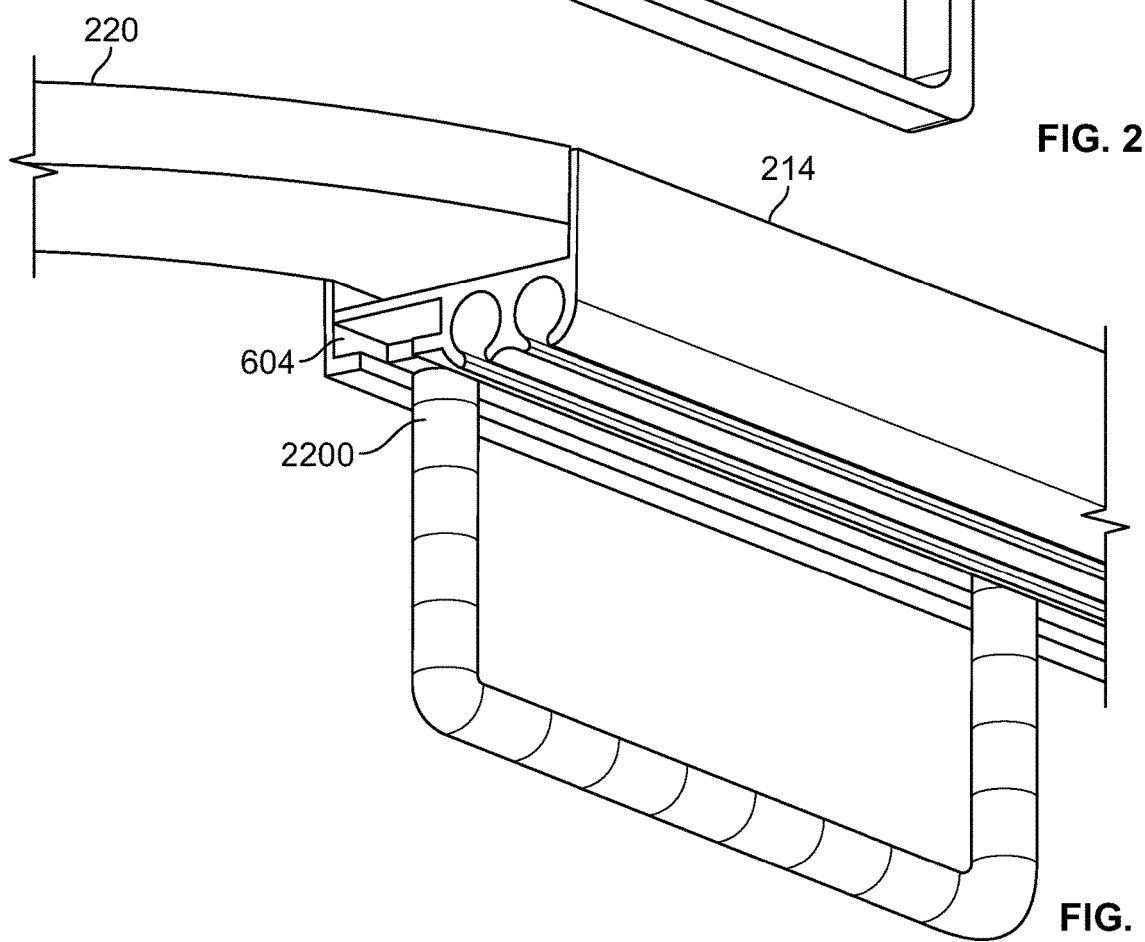
FIG. 22 shows a perspective view of a handle fully inserted into an elongated member according to certain embodiments.

FIG. 22 shows accessory 2200 completely engaged with keyway 604, which is included in elongated member 214.

Figure 23:
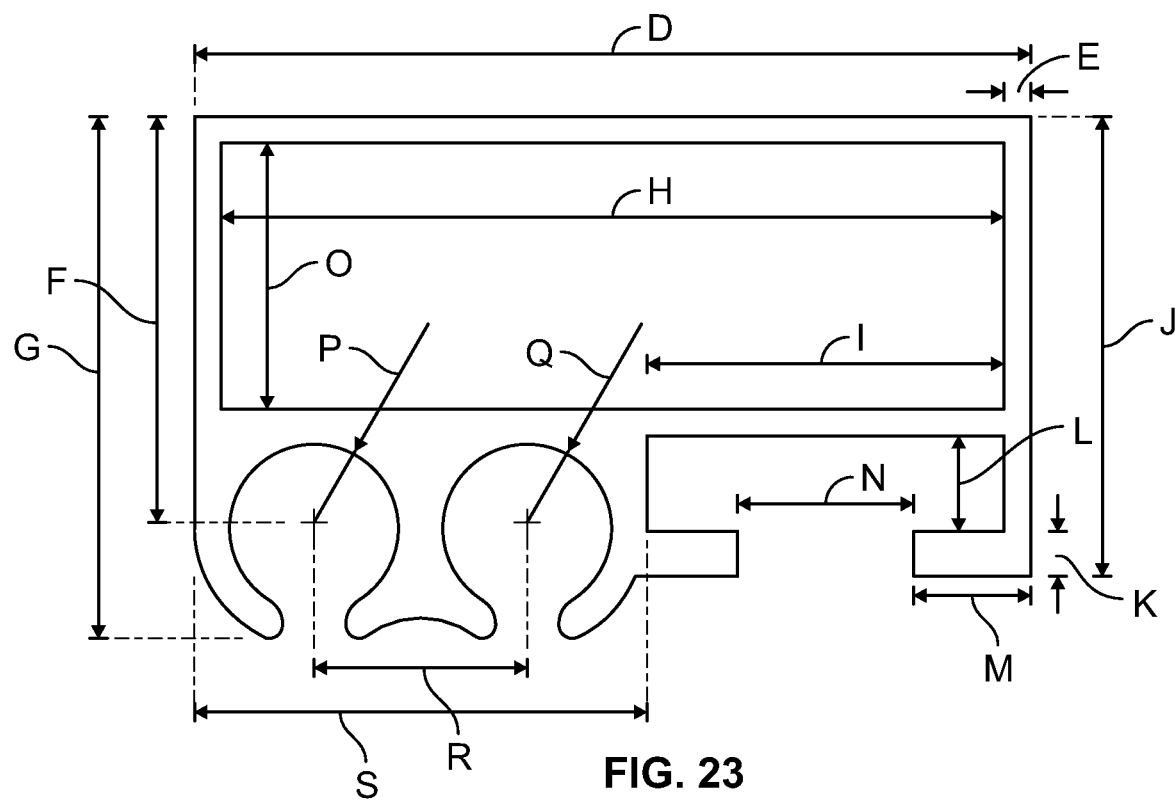
FIG. 23 shows a cutaway view of an elongated member according to certain embodiments.

FIG. 23 shows a cutaway view of elongated member 214 with exemplary measurements. Length D may be approximately 1.856 inches. Length E may be approximately 0.06 inches. Length F may be approximately 0.915 inches. Length G may be approximately 1.159 inches. Length H may be approximately 1.736 inches. Length I may be approximately 0.792 inches. Length J may be approximately 1.1021 inches. Length K may be approximately 0.099 inches. Length L may be approximately 0.213 inches. Length M may be approximately 0.260 inches. Length N may be approximately 0.390 inches. Length O may be approximately 0.591 inches. Radius P may be approximately 0.188 inches. Radius Q may be approximately 0.188 inches. Length R may be approximately 0.472 inches. Length S may be approximately 1.004 inches.

Figure 24:
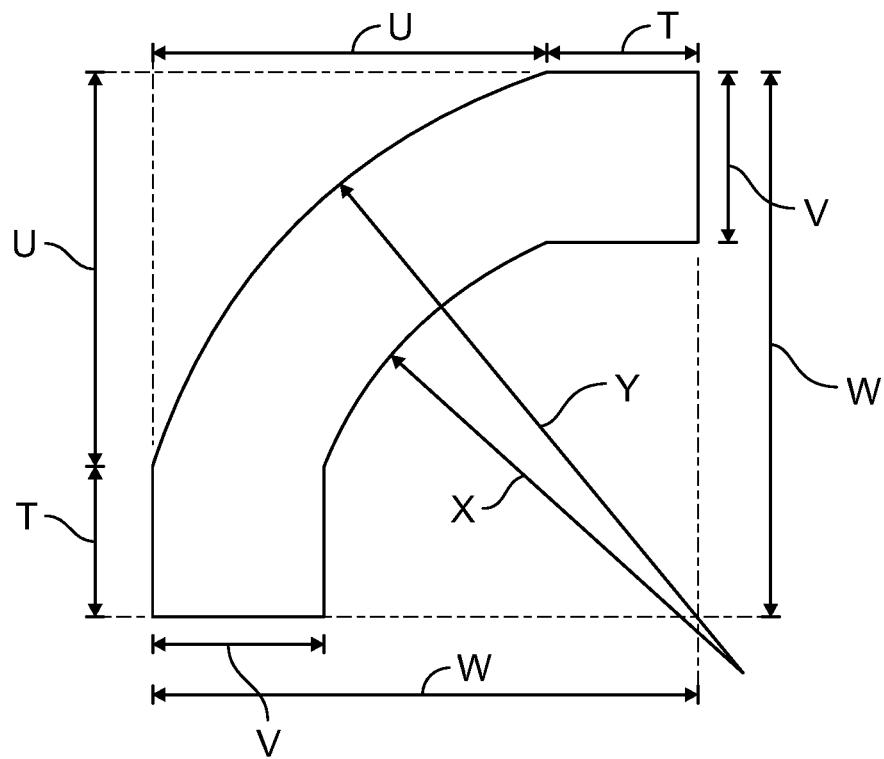
FIG. 24 shows a top view of a corner member according to certain embodiments.

FIG. 24 shows a top view of corner member 220 with exemplary measurements. Length T may be approximately 1.50 inches. Length U may be approximately 4.01 inches. Length V may be approximately 1.74 inches. Length W may be approximately 5.51 inches. Radius X may be approximately 4.24 inches. Radius Y may be approximately 5.98 inches FIG. 25 shows corner member 220 inserted into elongated member 214 with exemplary measurements. Length Z, which may define the space within cavity 602 which is not filled by corner member 220, may be approximately 0.20 inches.

FIG. 26 shows elongated member 216 with exemplary measurements. Elongated member 216 may be shorter than elongated member 214, as discussed above in connection with FIG. 3. Length AA may be approximately 35 inches.

FIG. 27 shows elongated member 214 with exemplary measurements. Elongated member 214 may be longer than elongated member 216, as discussed above in connection with FIG. 3. Length BB may be approximately 71.5 inches.

Figure 28:
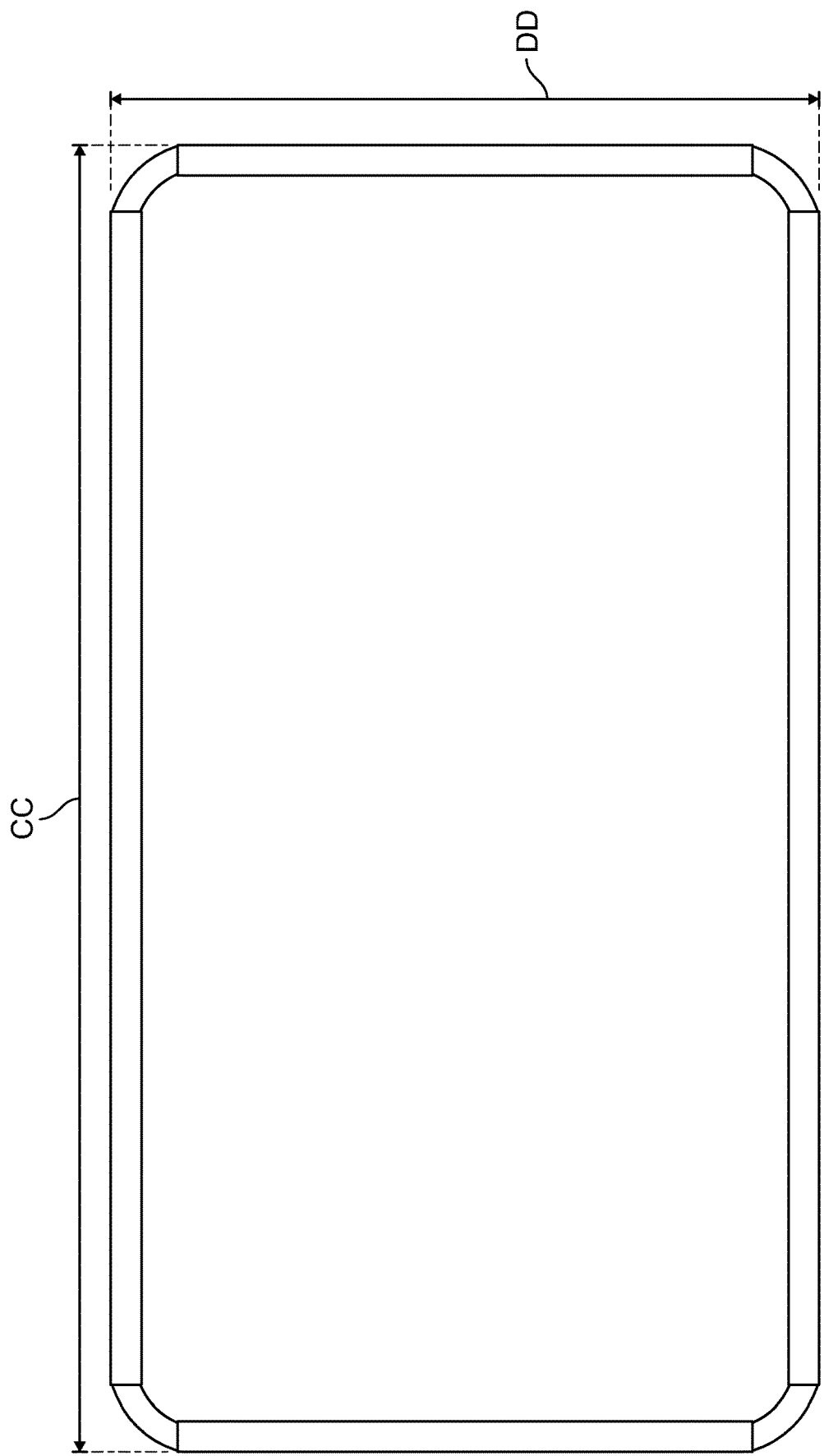
FIG. 28 shows a top view of a metal fixture according to certain embodiments.

FIG. 28 shows metal fixture 212 with exemplary measurements. Length CC may be approximately 79.65 inches. Length DD may be approximately 43.14 inches.

Thus, methods and apparatus for a track-based accessory system for use with a golf cart have been provided. Persons skilled in the art will appreciate that the present invention can be practiced by other than the described embodiments, which are presented for purposes of illustration rather than of limitation. The present invention is limited only by the claims that follow.

What is claimed is:

1. An apparatus for supporting a valance, a golf cart enclosure and at least one accessory, the apparatus comprising:
a metal fixture configured to be attached to a golf cart, the metal fixture including:
a first track located adjacent an outer longitudinal edge of the metal fixture;
a second track; and
a third track located adjacent an inner longitudinal edge of the metal fixture,
wherein:
the second track is located between the first track and the third track;
the first track includes a first slot that is configured to maintain the valance in a first position, wherein the first slot is rounded;
the second track includes a second slot that is configured to maintain the golf cart enclosure in a second position, wherein the second slot is rounded; and
the third track includes a third slot that is configured to maintain the at least one accessory in a third position, wherein the third slot is rectangular.

2. The apparatus of claim 1, wherein the at least one accessory comprises a handle.

3. The apparatus of claim 1, wherein the at least one accessory comprises a light.

4. The apparatus of claim 1, wherein the first slot, the second slot and the third slot open in the same direction.

5. The apparatus of claim 1, wherein the valance, the golf cart enclosure and the at least one accessory are removably engaged with the first, second and third track, respectively.

6. The apparatus of claim 1, wherein the first track and the second track are configured to mate with beads affixed to the valance and the golf cart enclosure, respectively.

7. A track-based accessory system for use with a golf cart, the track-based system comprising:
a metal fixture configured to be attached to a golf cart, the metal fixture comprising:
two short elongated members for use in the front and back of the golf cart, wherein each short elongated member comprises:
an enclosure track;
an accessory track; and
two ends;
two long elongated members for use on the two sides of the golf cart, wherein each long elongated member comprises:
an enclosure track;
an accessory track; and
two ends;
four corner members, wherein each corner member is configured to extend into:
one end of one of the long elongated members; and
one end of one of the short elongated members,
wherein:
each enclosure track includes an enclosure slot that is configured to engage the golf cart enclosure; and
each accessory track includes a keyway that is configured to engage the at least one accessory.

8. The system of claim 7, wherein each short elongated member and each long elongated member further comprises a valance track.

9. The system of claim 8, wherein each valance track includes a valance slot.

10. The system of claim 9, wherein the valance slot is configured to engage a valance.

11. The system of claim 7, wherein the accessory is hanging.

12. The system of claim 7, wherein the extruded metal fixture is configured to support a golf cart roof.

13. The system of claim 7, wherein the extruded metal fixture is constructed from aluminum.

14. A track-based accessory system for use with a golf cart, the track-based system comprising:
 two elongated members configured to be attached to a golf cart, wherein each elongated member comprises:
  an enclosure track located adjacent an outer longitudinal edge of the elongated member; and
  an accessory track located adjacent an inner longitudinal edge of the elongated member;
 wherein:
  each enclosure track includes an enclosure slot that is rounded and that is configured to engage a golf cart enclosure; and
  each accessory track includes a keyway that is rectangular and that is configured to engage at least one accessory.

15. The system of claim 14, wherein each elongated member further comprises a valance track.

16. The system of claim 14, wherein each valance track includes a valance slot.

17. The system of claim 14, wherein the valance slot is configured to engage a valance.

18. The system of claim 14, wherein the at least one accessory is hanging.

19. The system of claim 14, wherein the two elongated members are configured to support a golf cart roof.

20. The system of claim 14, wherein the two elongated members are constructed from aluminum.

21. The system of claim 14, wherein the enclosure slot is configured to mate with a rounded bead on the golf cart enclosure.

22. The system of claim 14, wherein the keyway is configured to mate with a rectangular key on the at least one accessory.

* * * * *